United States Patent
El-Faham et al.

(10) Patent No.: US 9,873,153 B1
(45) Date of Patent: Jan. 23, 2018

(54) SYNTHESIS OF METAL NANOPARTICLES USING MODIFIED MPEG POLYMER

(71) Applicant: KING SAUD UNIVERSITY, Riyadh (SA)

(72) Inventors: Ayman Sadek Ahmed El-Faham, Riyadh (SA); Zeid Abdullah Mohammed Al Othman, Riyadh (SA); Sameh Mohamed Mahmoud Osman, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/465,230

(22) Filed: Mar. 21, 2017

(51) Int. Cl.
*B22F 9/24* (2006.01)
*B22F 1/00* (2006.01)
*C08G 65/328* (2006.01)

(52) U.S. Cl.
CPC ............ *B22F 9/24* (2013.01); *B22F 1/0018* (2013.01); *C08G 65/328* (2013.01); *B22F 2009/245* (2013.01); *B22F 2202/11* (2013.01); *B22F 2301/10* (2013.01); *B22F 2301/255* (2013.01); *B22F 2304/054* (2013.01); *B22F 2998/10* (2013.01)

(58) Field of Classification Search
None
See application file for complete search history.

(56) References Cited

U.S. PATENT DOCUMENTS

| | | | |
|---|---|---|---|
| 2010/0172996 A1 | 7/2010 | Shin et al. | |
| 2012/0280186 A1* | 11/2012 | Sano ...................... | B22F 1/0022 252/514 |
| 2012/0283336 A1* | 11/2012 | Grigorenko ........... | B22F 1/0022 514/769 |
| 2014/0094626 A1* | 4/2014 | Challa ................... | B01L 3/5027 564/418 |

FOREIGN PATENT DOCUMENTS

| | | |
|---|---|---|
| JP | 2014198908 | 10/2014 |
| JP | 2016867 | 1/2016 |

\* cited by examiner

*Primary Examiner* — George Wyszomierski
(74) *Attorney, Agent, or Firm* — Richard C. Litman

(57) ABSTRACT

The synthesis of metal nanoparticles using a modified mPEG (methoxypolyethylene glycol) polymer includes the steps of: preparing a methanolic solution of a polymer; providing an aqueous solution including a metal salt; and combining the methanolic solution of the polymer with the aqueous metal salt solution to produce the metal nanoparticles, where the metal salt is $AgNO_3$, $CuCl_2$, $NiCl_2$, $CoCl_2$, $Pd(Ac)_2$, or $HAuCl_4$ and wherein the metal nanoparticles are silver, copper, cobalt, palladium, nicker or gold nanoparticles having a size between 1 nm and 100 nm in diameter.

10 Claims, 10 Drawing Sheets

SYNTHESIS OF METAL NANOPARTICLES USING MODIFIED MPEG POLYMER

BACKGROUND OF THE INVENTION

1. Field of the Invention

The present invention relates to green synthesis of metal nanoparticles, and particularly, to the synthesis of metal nanoparticles using a modified mPEG (methoxypolyethylene glycol) polymer as a reducing agent.

2. Description of the Related Art

Nanobiotechnology has increased enormous scientific progress in the field of research and technology. A merger of nanotechnology and biotechnology chiefly involves the application of nanoparticles to guide the development of novel strategies used to address biological issues. Nanoparticles play an important role in physics, chemistry, material science, cancer therapy, drug delivery, and in other promising field of applications. Among them, metal and polymer nanoparticles are commonly analyzed for application in the medicinal field. In addition, metal nanoparticles have inherent biological activities and are compatible for therapeutic applications.

Previous studies have produced silver nanoparticles (AgNPs) with sizes ranging from 50-200 nm and silver hydrosols ranging from 20-50 nm. Aggregation during synthesis can hinder the production of AgNPs with small and uniform sizes. For antimicrobial purposes, the formation of aggregates can reduce the antimicrobial ability of AgNPs. Stabilizers are incorporated in the AgNP manufacturing process to ensure their stability in aqueous solutions. Absorption of the stabilizing molecules onto the nanoparticle surface depends on the molecular weight, ionization, and charge density of the stabilizing molecules.

Thus, there is an imperative need to establish a methodology for the large-scale synthesis of silver nanoparticles. Usually, their mass production is performed through various physical and chemical methods, which often result in the accumulation of toxic chemicals in the environment, thereby posing a threat to human, animal, and plant health. Green synthesis is one of the best alternatives owing to its ecofriendly nature. In this regard, plant and microbe-mediated synthesis had been attempted in the past, and the plant system was found to be much faster than using a microbial system. Moreover, the green synthesized nanoparticles also exhibit strong cytotoxic, antimicrobial, and antioxidant activities.

Thus, the synthesis of metal nanoparticles using a modified mPEG (methoxypolyethylene glycol) polymer solving the aforementioned problems is desired.

SUMMARY OF THE INVENTION

The synthesis of metal nanoparticles using a modified mPEG (methoxypolyethylene glycol) polymer includes the steps of preparing a methanolic solution of a polymer; providing an aqueous solution including a metal salt; and combining the methanolic solution of the polymer with the aqueous metal salt solution to produce the metal nanoparticles. The metal salt may be, for example, silver nitrate ($AgNO_3$), and the resulting metal nanoparticles may be silver nanoparticles.

The synthesis of metal nanoparticles using a modified mPEG (methoxypolyethylene glycol) polymer further includes the steps of combining a solid metal salt with a polymer at room temperature to form a solid mixture; heating the solid mixture at about 60° C.; suspending the solid mixture in a methanol:water (1:1) (v/v) mixture until metal nanoparticles are formed; and isolating the metal nanoparticles by centrifugation. The metal salts can be selected from the group consisting of $AgNO_3$, $CuCl_2$, $NiCl_2$, $CoCl_2$, $Pd(Ac)_2$ and $HAuCl_4$, and the metal nanoparticles correspondingly formed are silver, copper, nickel, cobalt, palladium and gold nanoparticles having a diameter from about 5 nm to about 100 nm.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
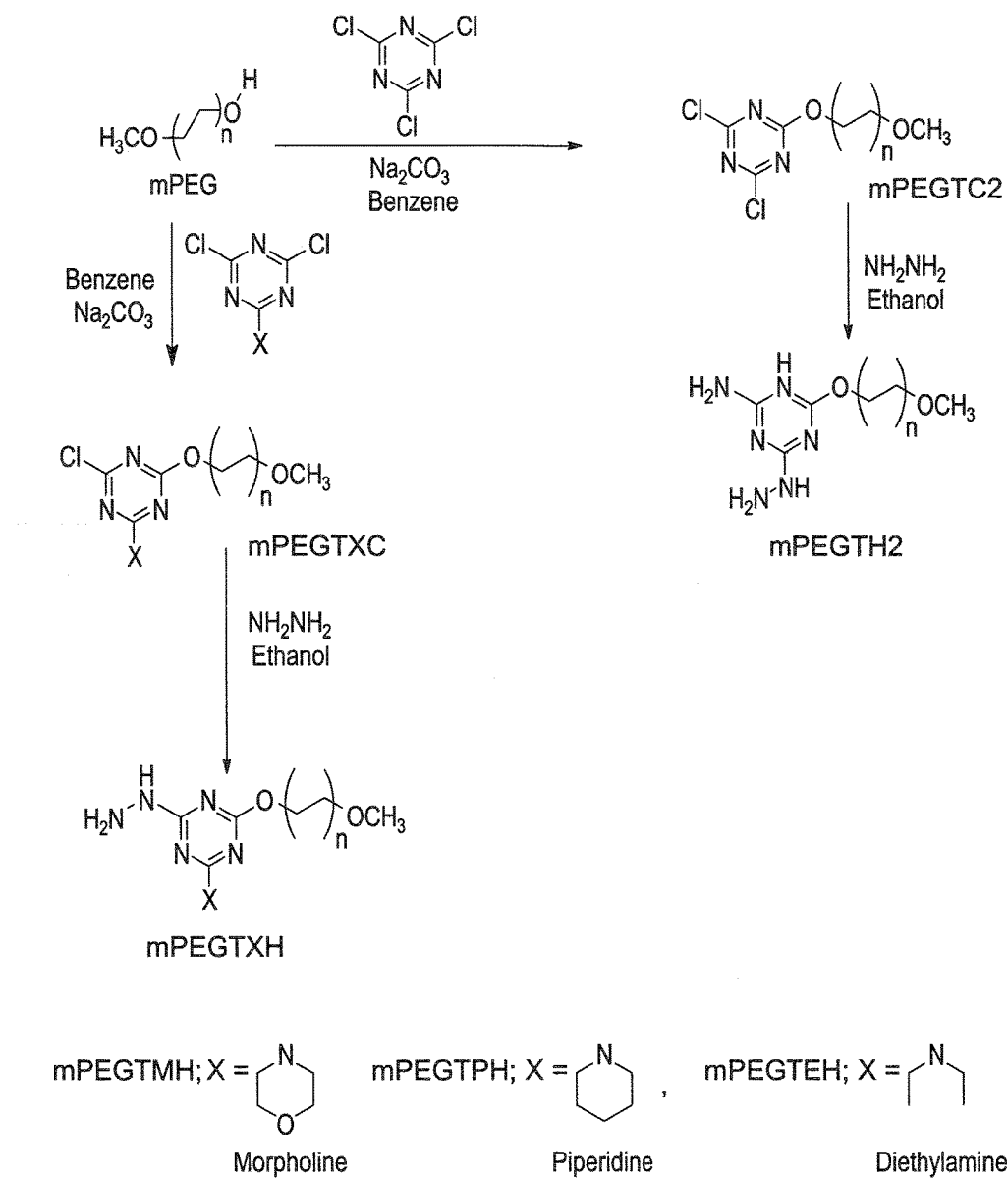
FIG. 1 is a reaction scheme for the synthesis of hydrazine PEG polymer derivatives, viz., mPEGTH2 and mPEGTXH, where X is morpholine, piperidine, or diethylamine.

The synthesis of metal nanoparticles using a modified mPEG (methoxypolyethylene glycol) polymer includes the steps of preparing a methanolic solution of a polymer; providing an aqueous solution including a metal salt; and combining the methanolic solution of the polymer with the aqueous metal salt solution to produce the metal nanoparticles. The methanolic solution of the polymer and the aqueous metal salt solution are mixed under stirring at room temperature. The metal salt may include, for example, silver nitrate ($AgNO_3$), and the resulting metal nanoparticles may be silver nanoparticles. The metal salt may be, for example, copper chloride (CuCl$_2$), and the resulting metal nanoparticles may be copper nanoparticles. The metal salt may be, for example, nickel chloride (NiCl$_2$), and the resulting metal nanoparticles may be nickel nanoparticles. The metal salt may be, for example, copper chloride (CoCl$_2$), and the resulting metal nanoparticles may be cobalt nanoparticles. The metal salt may be, for example, palladium acetate, and the resulting metal nanoparticles may be palladium nanoparticles. The metal salt may be, for example, chloroauric acid, and the resulting metal nanoparticles may be gold nanoparticles.

The aqueous metal salt solution can have a concentration of about 1 mM/ml to about 10 mM/ml. The metal nanoparticles produced by the present method have a diameter from about 1 nm to about 100 nm, preferably from about 1 nm to 50 nm.

The polymer is a hydrazine derivative-polyethylene glycol polymer represented by the formula below:

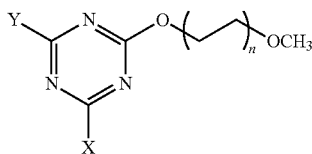

where n is an integer greater than 0, and where X and Y independently represent halogen, hydrazine, morpholine, piperidine, or diethylamine.

A method for synthesis of metal nanoparticles using a modified mPEG (methoxypolyethylene glycol) polymer comprises the steps of combining solid metal salt with a polymer at room temperature to form a solid mixture; heating the solid mixture at about 60° C.; suspending the solid mixture in a methanol:water (1:1) (v/v) mixture until metal nanoparticles are formed; and isolating the metal nanoparticles by centrifugation. The heating is provided by microwave radiation for about one minute.

The polymer is a hydrazine derivative polymer represented by the formula below:

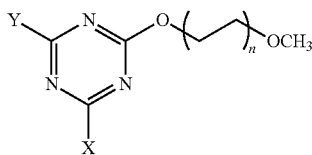

where n is an integer greater than 0, and where X and Y independently represent halogen, hydrazine, morpholine, piperidine or diethylamine.

The metal salts may be selected from the group consisting of AgNO$_3$, CuCl$_2$, NiCl$_2$, CoCl$_2$, Pd(Ac)$_2$ and HAuCl$_4$, and the resulting metal nanoparticles produced are correspondingly silver, copper, nickel, cobalt, palladium and gold nanoparticles. The metal nanoparticles are typically from about 5 nm to about 100 nm in diameter, and the metal nanoparticles may be spherical, spheroidal, elongated spherical, rod-shaped, and/or faceted.

As used herein, the term "nanoparticle" refers to a particle having at least one dimension between 1 and 100 nanometers. The metal nanoparticles described herein may be silver nanoparticles. The metal nanoparticles may be from about 5 nm to about 100 nm in diameter, and preferably from about 20 nm to about 30 nm in diameter. Also, the silver nanoparticles are effective as an antimicrobial or as an antiparasitic agent. The method of producing metal nanoparticles using the hydrazine reprivatized PEG polymer is a green, simple, cost effective and affordable method, which can easily be scaled up for large scale synthesis.

Methoxypolyethylene glycol (mPEG) is a protected version of polyethylene glycol (PEG), from which monofunctional reactive polymers can be prepared. These are ideal for the conjugation of proteins, as they do not lead to the cross-linking of the macromolecules. Methoxypolyethylene glycol is a biocompatible and non-biodegradable class of polymer that has characteristic properties that make it particularly attractive for protein polymer conjugation, e.g., mPEG is soluble in water and also in many typical organic solvents. As a unique feature, mPEG is soluble in methylene chloride, chloroform, toluene, acetonitrile and other solvents, while it is not soluble in ethyl ether, iso-propanol and aliphatic hydrocarbon solvents. This unique solubility behavior allows the purification of mPEG and mPEG derivatives from low molecular weight organic impurities via a simple precipitation centrifugation work-up. Also, methoxypolyethylene glycol is not antigenic, immunogenic or toxic. However, the occurrence of antibodies against PEG (anti-PEG) in healthy blood donors has been reported when high polymer loads were employed. Methoxypolyethylene glycol has been approved by the FDA for human use in intravenous, oral and dermal applications. Methoxypolyethylene glycol chains are flexible, and in aqueous solution coordinate 2-3 water molecules per oxyethylene unit. Currently, mPEG polymers are commercially available in different molecular weights, which are suitable for pharmacological applications.

The hydroxyl group of mPEG is not reactive enough to allow direct coupling of the polymer to bio-macromolecules. Thus, to make mPEG useful for the conjugation of proteins, the terminal hydroxyl group should be converted into a group that can react with some of the functional groups present in the bio-macromolecule.

In this regard, cyanuric chloride (2,4,6-trichlorotriazine) has emerged as a major class of linker unit for immobilization of biomolecules owing to its low cost, and it has three reactive sites (two of them needed in the reaction). Further, it has chemoselective reactivity and biocompatibility properties. However, this molecule has been used for modification of mPEG and proved to be an excellent activator for reacting with peptide and protein.

The present method can be categorized into three areas. The first involves the chemical modification of methoxypolyethylene glycol with hydrazino-s-triazine. Methoxylpolyethylene glycol with different molecular weight will be modified with cyanuric chloride (2,4,6-trichloro-1,3,5-triazine) to afford the product mPEG-TC2, mPEGTMCl as described in FIG. 1.

The second area involves the application for the synthesis of different metal nanoparticles in aqueous media (liquid phase). Different metal salts, such as AgNO$_3$, CuX$_2$, Ni (X)$_2$, Co(X)$_2$, HAuX$_4$, PdX$_2$, etc. (X=Cl or NO$_3$), will be reacted with the modified methoxypolyethylene glycol (mPEG-TH2 or mPEGTXH) under ecofriendly conditions, such as water and/or methanol, to generate the metal nanoparticles. The metal nanoparticles are subsequently characterized by different spectroscopic techniques, such as UV-Vis, XRD, EDX, TEM, etc.

The third area involves the application for the synthesis of different metal nanoparticles in solvent free condition (solid phase synthesis). Different metal salts (such as AgNO$_3$, CuX$_2$, Ni (X)$_2$, Co(X)$_2$, HAuX$_4$, PdX$_2$, etc. (X=Cl or NO$_3$)

will be mixed with the modified methoxypolyethylene glycol (mPEG-TH2 or mPEGTXH) under ecofriendly conditions, such as conventional heating, microwave, or ultrasonic irradiation, to generate the metal nanoparticles. The metal nanoparticles are characterized by different techniques, such as UV-Vis, XRD, EDX, TEM, etc.

The materials used in the following examples of the method are as follows. Methoxypolyethylene glycol (mPEG) with molecular weight 2000 and 5000 and 2,4,6-trichloro-1,3,5-triazine (cyanuric chloride were obtained from Sigma-Aldrich. $CuCl_2$, $NiCl_2$, $CoCl_2$, $Pd(Ac)_2$, $HAuCl_4$ and $AgNO_3$ salts were also purchased from Merck. All the chemicals used in the study were analytical grade. The evaluation of crystal structure was achieved by X-ray diffractometer (XRD) using $CuK\alpha$ radiation. The studies of size, morphology, and composition of the nanoparticles (NPs) were performed by means of transmission electron microscopy (TEM), equipped with energy dispersive X-ray (EDX) analysis. Histograms of AgNPs' size distribution were calculated from the TEM images by measuring the diameters of at least 50 particles. Samples for TEM studies were prepared by placing drops of the AgNPs solutions on carbon-coated TEM. The following examples will further illustrate the process of making the metal nanoparticles from the modified mPEG polymers.

Example 1

Synthesis of (mPEGTC2)

About 20 gm of mPEG (2000 or 5000 molar mass) was dissolved in anhydrous benzene (200 mL), cooled to 15° C., and then slowly added to a solution of cyanuric chloride in benzene (5-fold molar excess, in 200 mL); 5-fold molar excess of anhydrous sodium carbonate was then added. The mixture was stirred for 24 h at 25° C., and then the sodium carbonate was removed by vacuum filtration. The mPEGTC2 derivative was precipitated with petroleum ether 40-60 ratio, the precipitate collected by vacuum filtration, and then re-suspended in benzene (100 mL) and precipitated again with petroleum ether 40-60. This process was repeated one more times to remove any unreacted cyanuric chloride and afford the pure white solid in 82% yield.

Example 2

Synthesis of (mPEGTXC)

About 20 gm of mPEG (2000 or 5000 Molar mass) was dissolved in anhydrous benzene (200 mL), cooled to 15° C., and then slowly added to a solution of 2,4-dichloro-6-substituted-1,3,5-triazine in benzene (5-fold molar excess, in 200 mL); 5-fold molar excess of anhydrous sodium carbonate was then added. The mixture was stirred for 24 h at 60° C., and then the sodium carbonate was removed by vacuum filtration. The mPEGTXC derivative was precipitated with petroleum ether 40-60, the precipitate collected by vacuum filtration, and then resuspended in benzene (100 mL) and precipitated again with petroleum ether 40-60. This process was repeated one more times to remove any unreacted cyanuric chloride and afford the pure white solid in 80% yield.

Example 3

Synthesis of mPEGTH2

10 g of mPEGTC2 were added to a solution of hydrazine hydrate 80% (20 mL) in ethanol (100 mL). The reaction mixture was refluxed for 6 h. The reaction mixture was cooled to room temperature and the excess of solvent and hydrazine hydrate were concentrated under reduced pressure, and then excess ether was added to afford a white solid, which was separated by filtration, washed with ether, and then dried under vacuum to afford the final modified product mPEGTH2 in almost quantitative yield (FIG. 1).

Example 4

Synthesis of mPEGTXH 10 g of mPEGTXC were added to a solution of hydrazine hydrate 80% (10 mL) in ethanol (100 mL). The reaction mixture was refluxed for 6 h. The reaction mixture was cooled to room temperature, and the excess of solvent and hydrazine hydrate were concentrated under reduced pressure. Then, excess ether was added to afford a white solid, which was separated by filtration, washed with ether, and dried under vacuum to afford the final modified product mPEGTM2 in almost quantitative yield (FIG. 1). The products are characterized by FTIR (FIG. 2) and thermogravimetry analysis (TGA, FIGS. 3-7).

Figure 2:
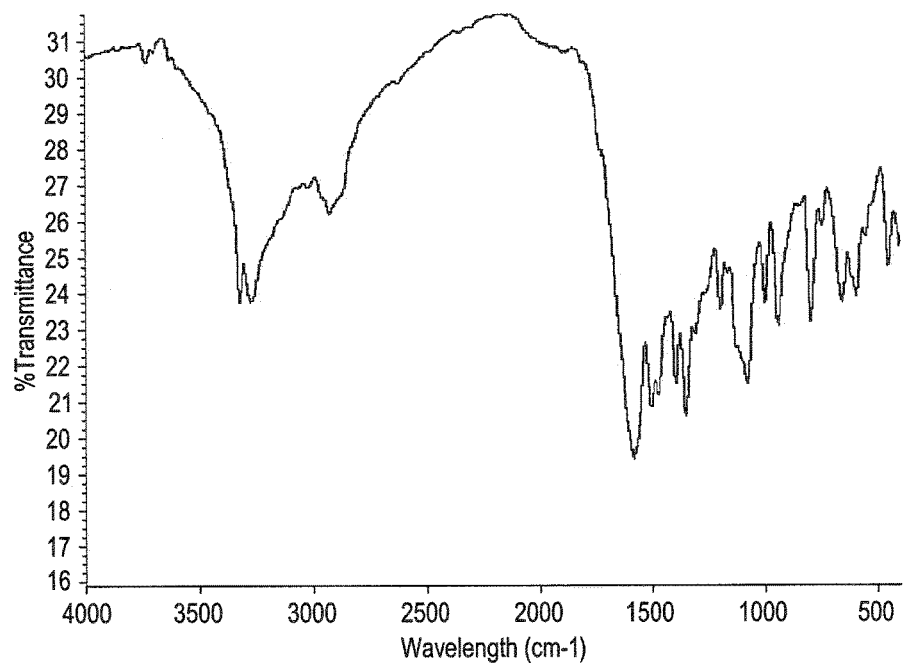
FIG. 2 shows the FTIR spectrum of mPEGTH2.
Figure 3:
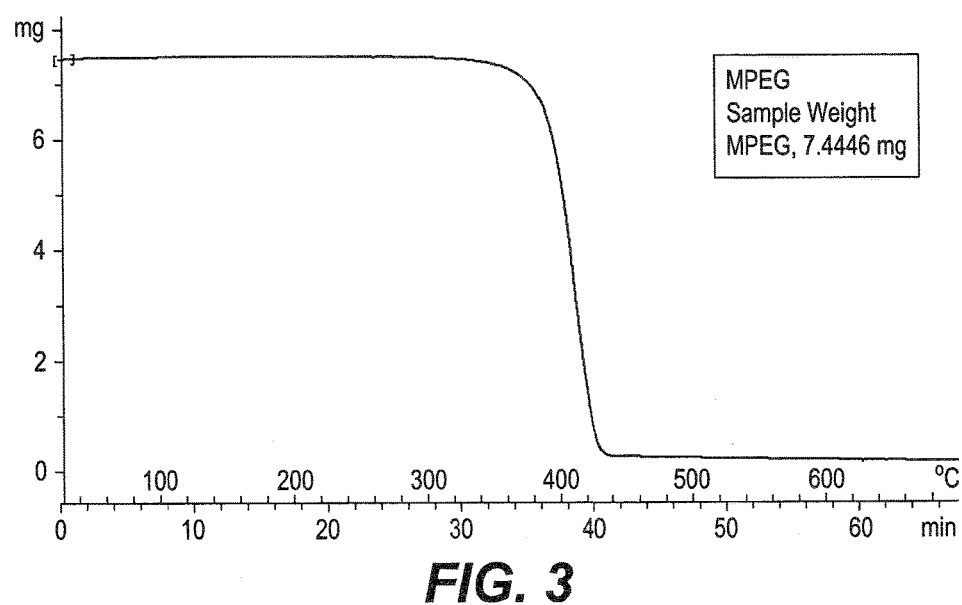
FIG. 3 shows the thermogravimetric analysis (TGA) spectrum of mPEG (methoxypolyethylene glycol).
Figure 4:
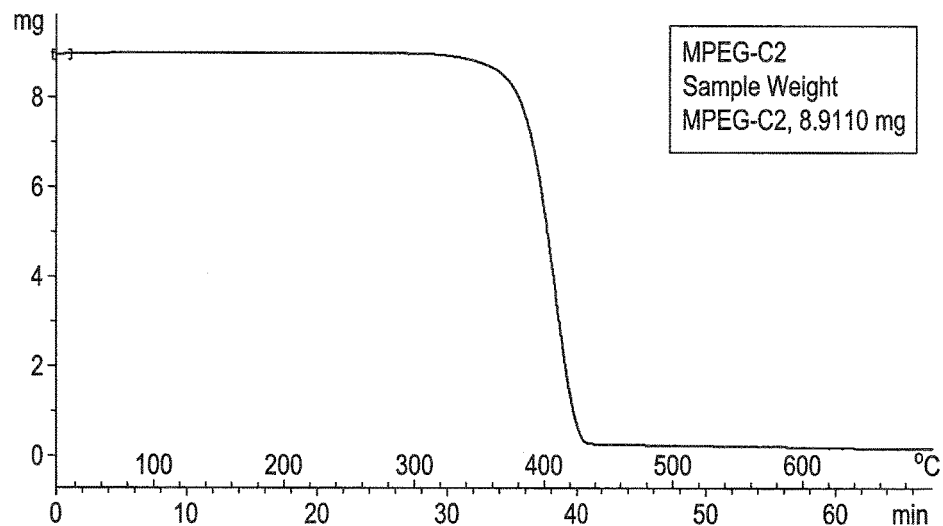
FIG. 4 shows the thermogravimetric analysis (TGA) spectrum of mPEG-C2
Figure 5:
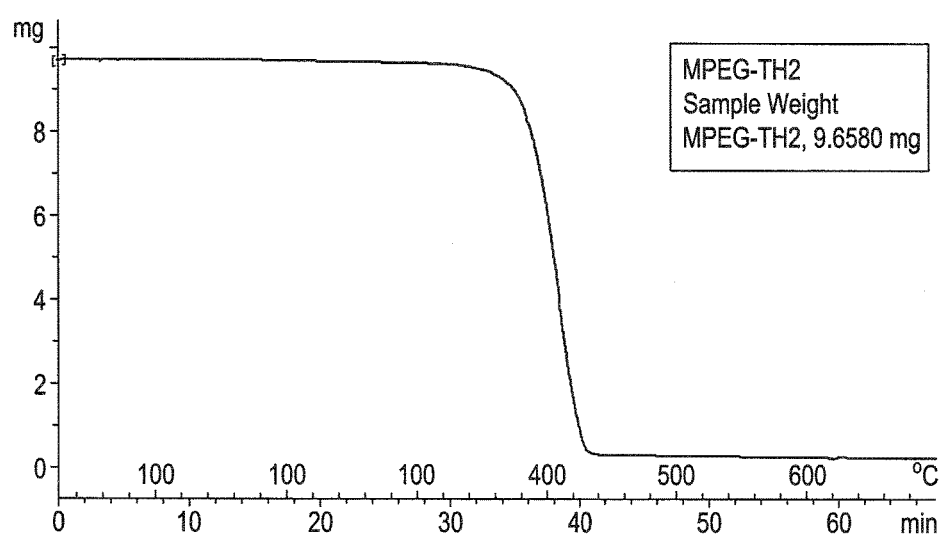
FIG. 5 shows the TGA spectrum for mPEG-TH2.
Figure 6:
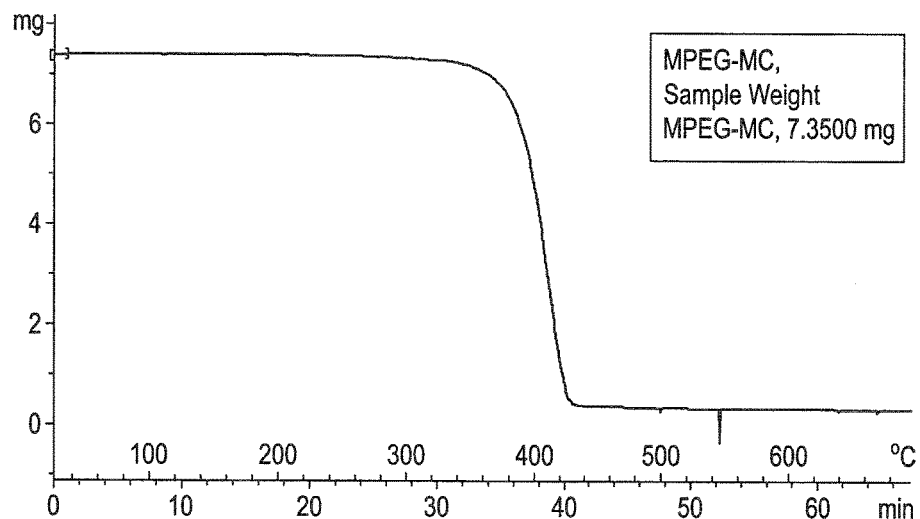
FIG. 6 shows the TGA spectrum for mPEG-MC.
Figure 7:
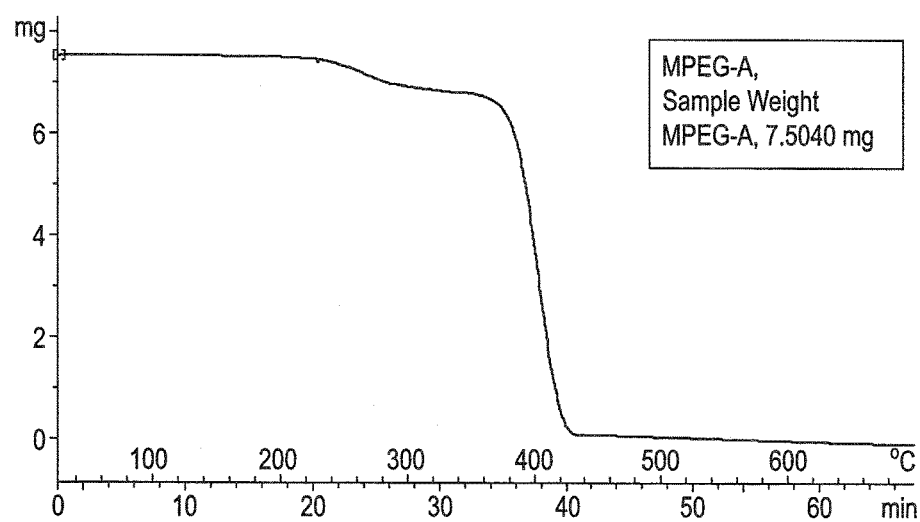
FIG. 7 shows the TGA spectrum for mPEG-A.

The FTIR spectrum, shown in FIG. 2, showed an increase in intensity for the characteristic band for —NH group at 3400 $cm^{-1}$. The TGA spectra (FIGS. 3-7) showed the entire products obtained have almost the same thermal stability, with no ash residue, which could be suitable for medical applications.

Example 5

Synthesis of Ag Nanoparticles

The synthesized, modified mPEGTH2 or mPEGTXH was used for preparation of silver nanoparticles (AgNPs) using different conditions, which included (a) liquid phase in methanol-water medium at room temperature; or (b) solid phase using normal heating or microwave irradiation. All gave a very good result in very short reaction time. The modified products were also used for preparation of different metal nanoparticles, such as CuNPs, PdNPs, and AuNPs in nanoscale size.

Example 6

Liquid Phase Synthesis of Metal Nanoparticles in Methanol-Water Medium

A solution of $10^{-3}$ M $AgNO_3$ (or other metal salt such as Cu, Au, Pd, Ni, etc.) in 20 mL of water was added to a suspended solution of $10^{-2}$ M solution of the modified polymer (mPEGTH2 or (mPEGTXH) in 20 mL methanol under stirring at room temperature. The reaction mixture was stirred at room temperature overnight. The color changed for Ag ions from colorless to reddish black, then to black. For copper ions, color changed blue to light green. Gold ions changed light yellow to violet. Palladium ions changed light yellow to black. The AgNPs were collected using a centrifuge, washed with methanol and then dried under vacuum.

Example 7

Solid-Solid Using Normal Heating or Microwave Irradiation 0.1 gm of $AgNO_3$ was mixed well with 0.2 gm of the modified polymer (mPEGTH2 or (mPEGTXH) at room temperature. The solid mixture was heated at 60° C. for 1 min using normal heating conditions (microwave condition 600 Watt, 60° C. for 5-10 sec). The resulting AgNPs were suspended in methanol-water mixture 1:1 and then collected using centrifuge, washed with methanol, and then dried under vacuum.

Figure 8:
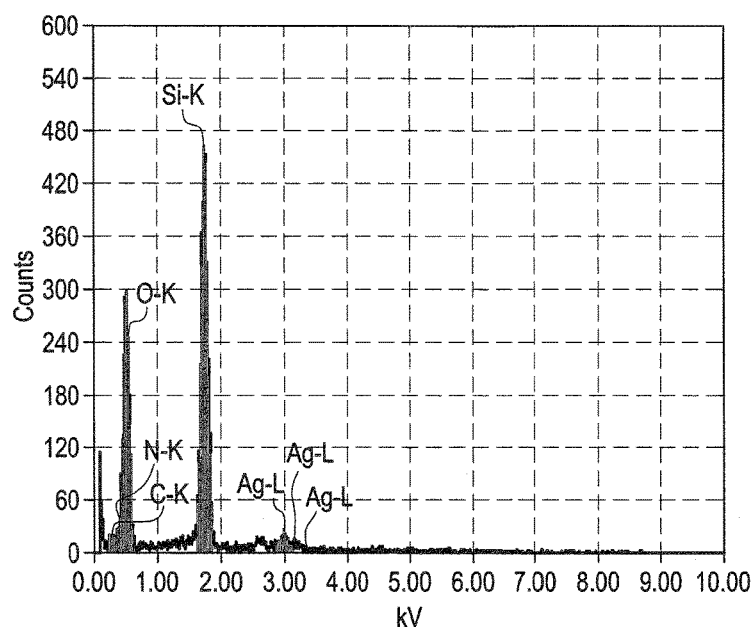
FIG. 8 is the energy dispersive X-ray spectra of the prepared AgNPs from solution.

The elemental analysis of the AgNPs was performed using EDX on the TEM. EDX analysis confirmed the presence of the elementary silver signal of the prepared AgNPs, as shown in FIG. 8. Signal peaks in the range of 2.5-4 keV were observed, which correspond to the binding energies of crystalline silver. Also, a strong signal peak near 0.2 keV corresponded to carbon in the ligand to the TEM holding grid. These results were confirmed by previous reports that showed that AgNPs are crystalline in nature with the same EDX results.

Figure 9:
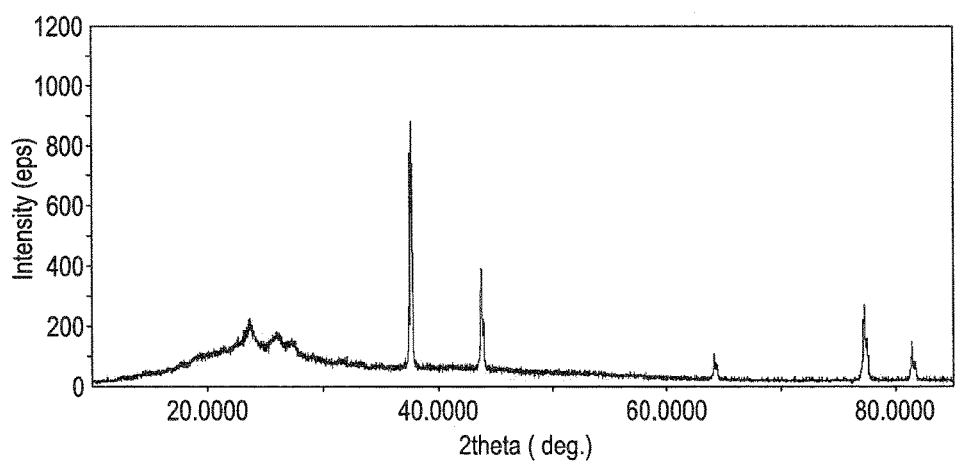
FIG. 9 is an X-ray diffraction spectra of the prepared silver nanoparticles (AgNPs) from solution.
Figure 10:
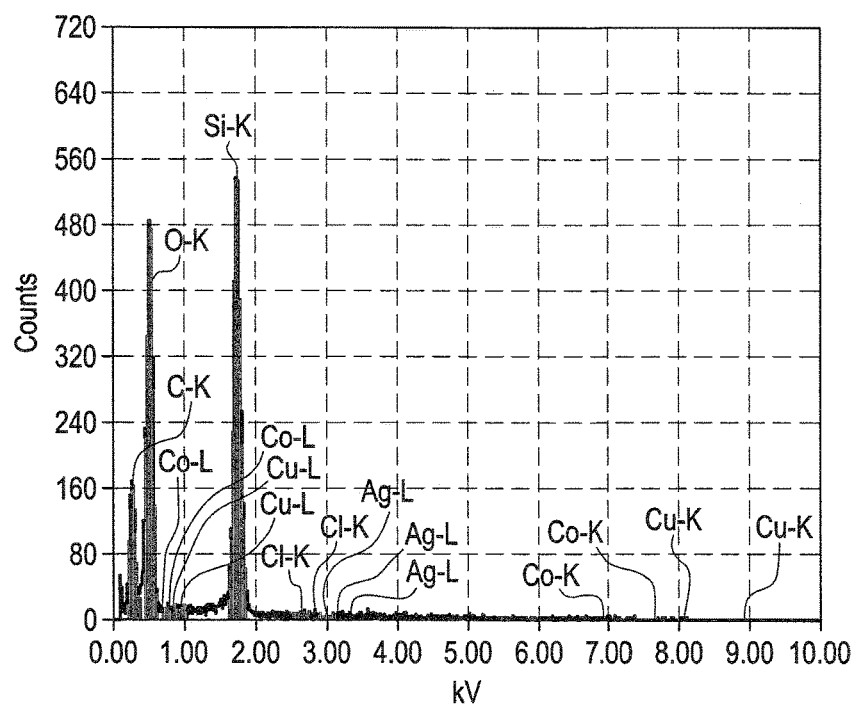
FIG. 10 is energy dispersive X-ray spectra of the prepared copper nanoparticles (CuNPs) from solution.

The XRD patterns (FIGS. 8-9) showed peaks at about 38.1° C., 44.09° C., 64.36° C., 77.29° C., and 81.31° C. for both the prepared materials, which corresponded to 111, 200, 220, 311, 222, 400, 331, and 420 planes, respectively, to indicate a typical face-centered cubic structure of silver as per the available literature (Joint Committee on Powder Diffraction Standards, JCPDS file No 04-0783). FIG. 10 shows the energy dispersive X-ray spectra of the prepared CuNPs from solution.

Figure 11:
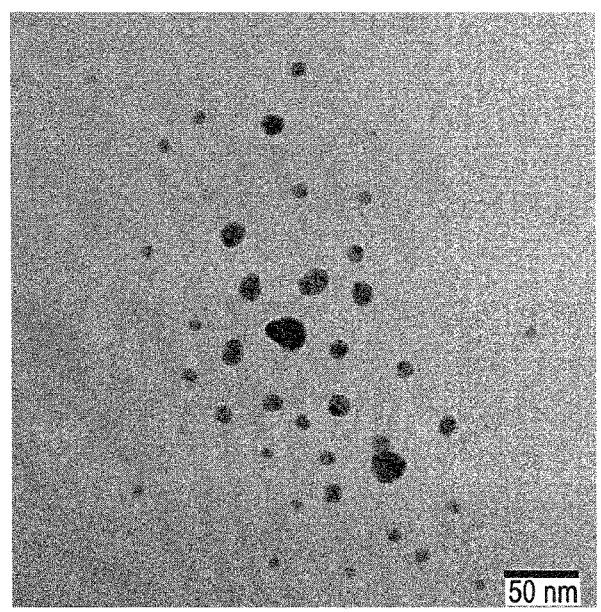
FIG. 11 is a transmission electron micrograph (TEM) of AgNPs solution using mPEGTH2.
Figure 12:
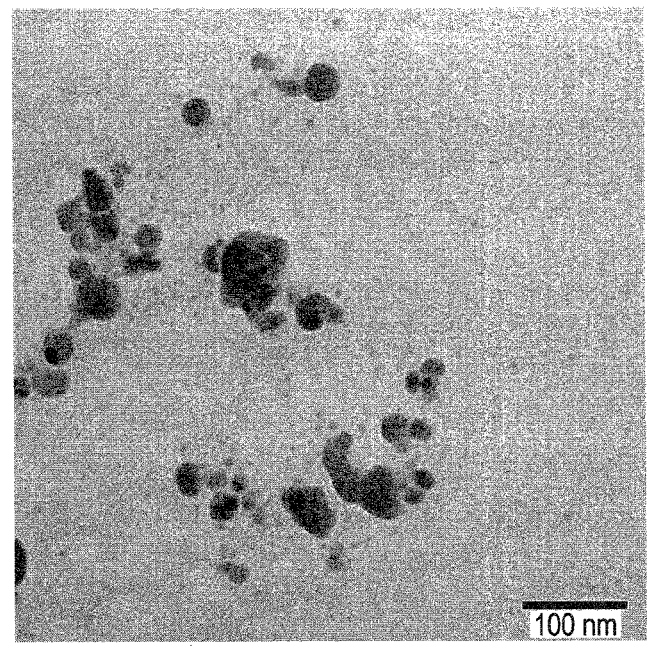
FIG. 12 is a TEM micrograph of AgNPs solution using mPEGTMH.
Figure 13:
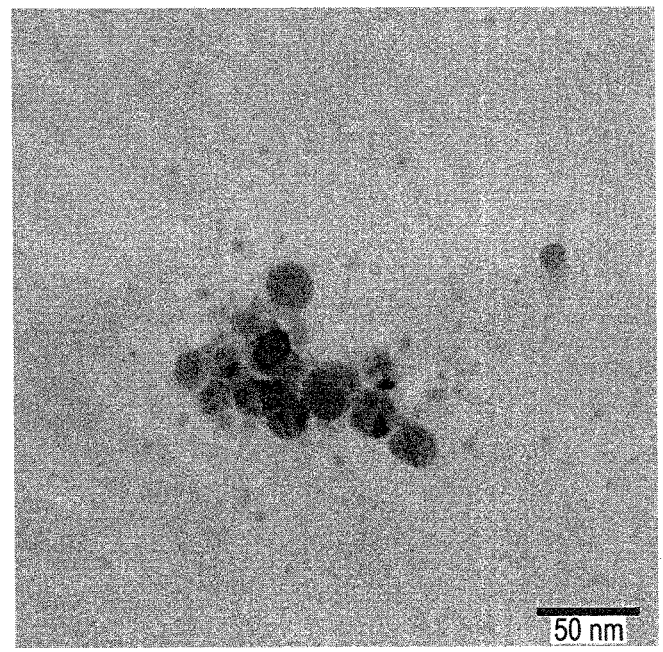
FIG. 13 is a TEM micrograph of AgNPs solution using mPEGTH2.
Figure 14:
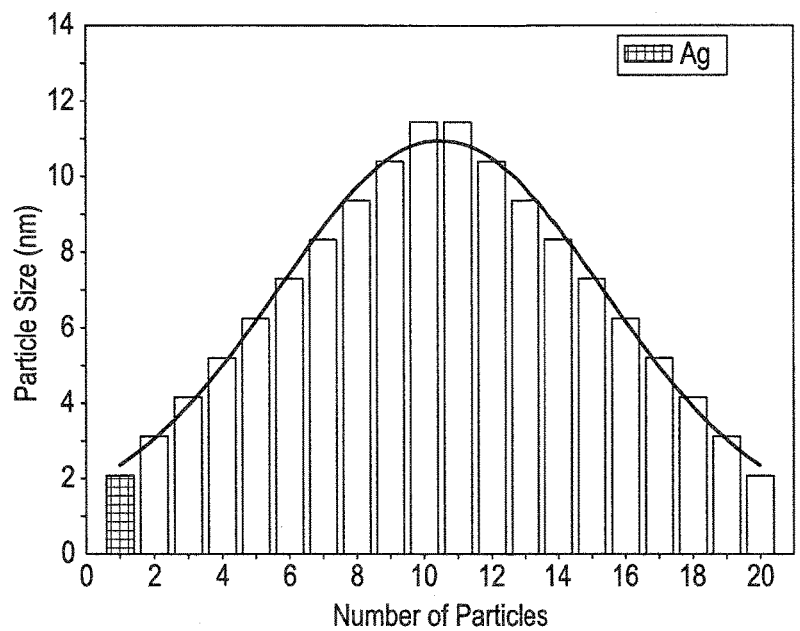
FIG. 14 is a chart showing the particle size distribution of silver nanoparticles (AgNPs).
Figure 15:
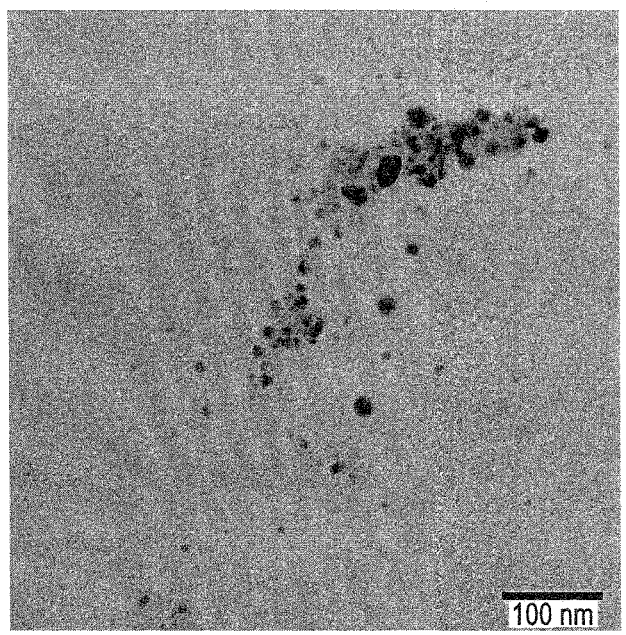
FIG. 15 is a TEM micrograph of CuNPs (solid phase) using mPEGTH2.
Figure 16:
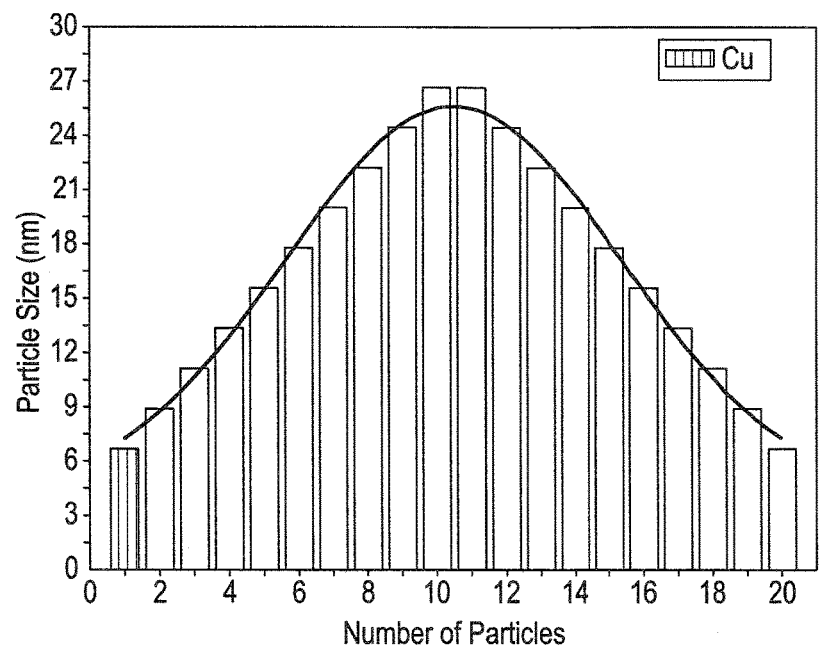
FIG. 16 is a chart showing the particle size distribution of copper nanoparticles (CuNPs).
Figure 17:
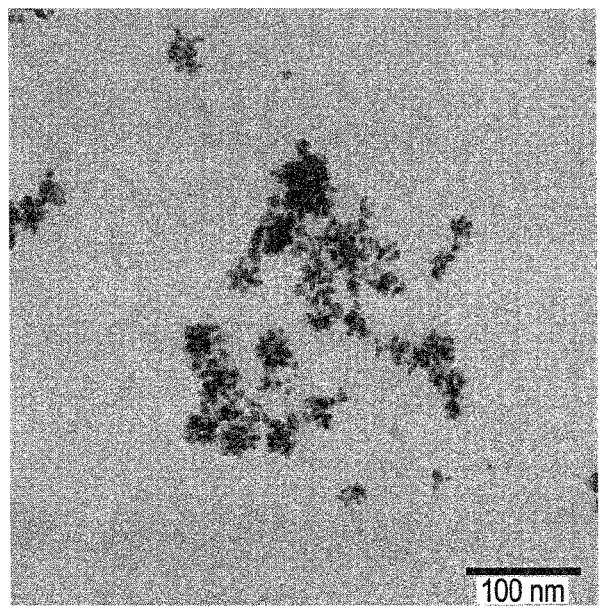
FIG. 17 is a TEM micrograph of gold nanoparticles (AuNPs) (solution phase) using mPEGTH2.
Figure 18:
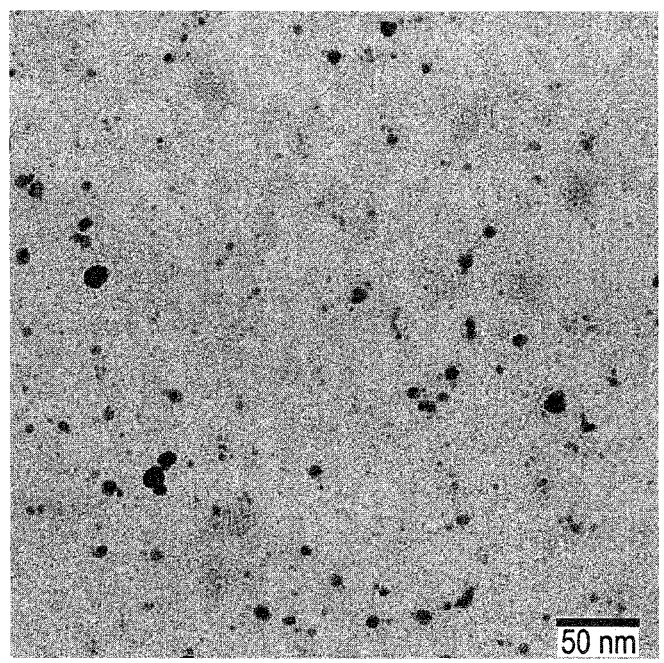
FIG. 18 is a TEM micrograph of palladium nanoparticles (PdNPs) (solution phase) using mPEGTH2.

The TEM images of the synthesized silver are shown in FIGS. 11-13 and the particle size distribution of the silver nanoparticles is displayed in FIG. 14. Analysis of the TEM images demonstrates that the prepared AgNPs are monodispersed spheres having a diameter in the range of 8-15 nm using mPEGTH2, and in the range 8-20 nm using mPEGTMH as the polymers. The TEM image of the synthesized copper nanoparticles, CuNPs, is shown in FIG. 15, and the particle size distribution of the silver nanoparticles is displayed in FIG. 16. Analysis of the TEM image shows that the prepared CuNPs are monodispersed spheres with a diameter in the range of 10-25 nm. The TEM image of the synthesized AuNPs is represented in FIG. 17. Analysis of the TEM image shows that the prepared AuNPs are monodispersed spheres with a diameter in the range of 4-12 nm. The TEM image of the synthesized PdNPs is shown in FIG. 18. Analysis of TEM imaging shows that prepared PdNPs are monodispersed spheres in the range of 2-8 nm.

It is to be understood that the present invention is not limited to the embodiments described above, but encompasses any and all embodiments within the scope of the following claims.

We claim:

1. A method for synthesis of metal nanoparticles using a modified methoxypolyethylene glycol (mPEG) polymer, comprising the steps of:
preparing a methanolic solution of the polymer, wherein the modified mPEG polymer has the formula:

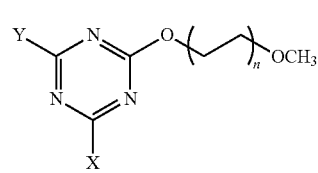

Formula I where n is an integer greater than 0, and where X and Y independently represent halogen, hydrazine, morpholine, piperidine or diethylamine;
providing an aqueous solution including a metal salt; and
combining the methanolic solution of the polymer with the aqueous metal salt solution to produce the metal nanoparticles.

2. The method for synthesis of metal nanoparticles according to claim 1, wherein the methanolic solution of the polymer and the aqueous metal salt solution are mixed under stirring at room temperature.

3. The method for synthesis of metal nanoparticles according to claim 1, wherein the metal salt is selected from the group consisting of $AgNO_3$, $CuCl_2$, $NiCl_2$, $CoCl_2$, $Pd(Ac)_2$ and $HAuCl_4$.

4. The method for synthesis of metal nanoparticles using a polymer according to claim 3, wherein the aqueous metal salt solution has a concentration between 1 mM/ml and 10 mM/ml.

5. The method for synthesis of metal nanoparticles according to claim 3, wherein the metal nanoparticles are between 1 nm and 100 nm in diameter.

6. The method for synthesis of metal nanoparticles according to claim 3, wherein the metal nanoparticles are between 1 nm and 25 nm in diameter.

7. The method for synthesis of metal nanoparticles according to claim 3, wherein the metal salt is silver nitrate ($AgNO_3$) and the metal nanoparticles are silver nanoparticles.

8. The method for synthesis of metal nanoparticles according to claim 3, wherein the metal salt is chloroauric acid ($HAuCl_4$) and the metal nanoparticles are gold nanoparticles.

9. The method for synthesis of metal nanoparticles according to claim 3, wherein the metal salt is copper chloride ($CuCl_2$) and the metal nanoparticles are copper nanoparticles.

10. The method for synthesis of metal nanoparticles according to claim 3, wherein the metal salt is palladium acetate [$Pd(Ac)2$] and the metal nanoparticles are palladium nanoparticles.

* * * * *